(12) United States Patent
Redlich

(10) Patent No.: US 12,388,312 B2
(45) Date of Patent: Aug. 12, 2025

(54) FUNCTIONAL INSULATION OF AN ELECTRICAL MACHINE

(71) Applicant: AUDI AG, Ingolstadt (DE)

(72) Inventor: Jürgen Redlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 345 days.

(21) Appl. No.: 18/166,377

(22) Filed: Feb. 8, 2023

(65) Prior Publication Data

US 2023/0253850 A1     Aug. 10, 2023

(30) Foreign Application Priority Data

Feb. 9, 2022   (DE) .......................... 102022102967.0

(51) Int. Cl.
*H02K 3/34*     (2006.01)
(52) U.S. Cl.
CPC ..................................... *H02K 3/345* (2013.01)
(58) Field of Classification Search
CPC .. H02K 3/00; H02K 3/22; H02K 3/24; H02K 3/30; H02K 3/34; H02K 3/345; H02K 3/40; H01B 3/00; H01B 3/08; H01B 3/44; H01B 3/445; H01B 3/48; H01B 7/00; H01B 7/02; H01B 7/025; H01B 7/0275

See application file for complete search history.

(56) References Cited

U.S. PATENT DOCUMENTS

| 2015/0042198 A1 | 2/2015 | Brockschmidt et al. |
| 2021/0005346 A1 | 1/2021 | Tomizawa et al. |

FOREIGN PATENT DOCUMENTS

| DE | 102018219219 A1 | 5/2020 | |
| WO | WO 2012113853 A1 | 8/2012 | |
| WO | WO 2014109977 A1 | 7/2014 | |
| WO | WO2015137342 A1 * | 9/2015 | ............... H02K 3/12 |
| WO | WO2017047247 A1 * | 3/2017 | ............. H02K 3/345 |

* cited by examiner

*Primary Examiner* — Tran N Nguyen
(74) *Attorney, Agent, or Firm* — Seed Intellectual Property Law Group LLP

(57) ABSTRACT

A system includes a copper conductor for the functional insulation of an electrical machine and a stator equipped with the copper conductor.

9 Claims, 1 Drawing Sheet

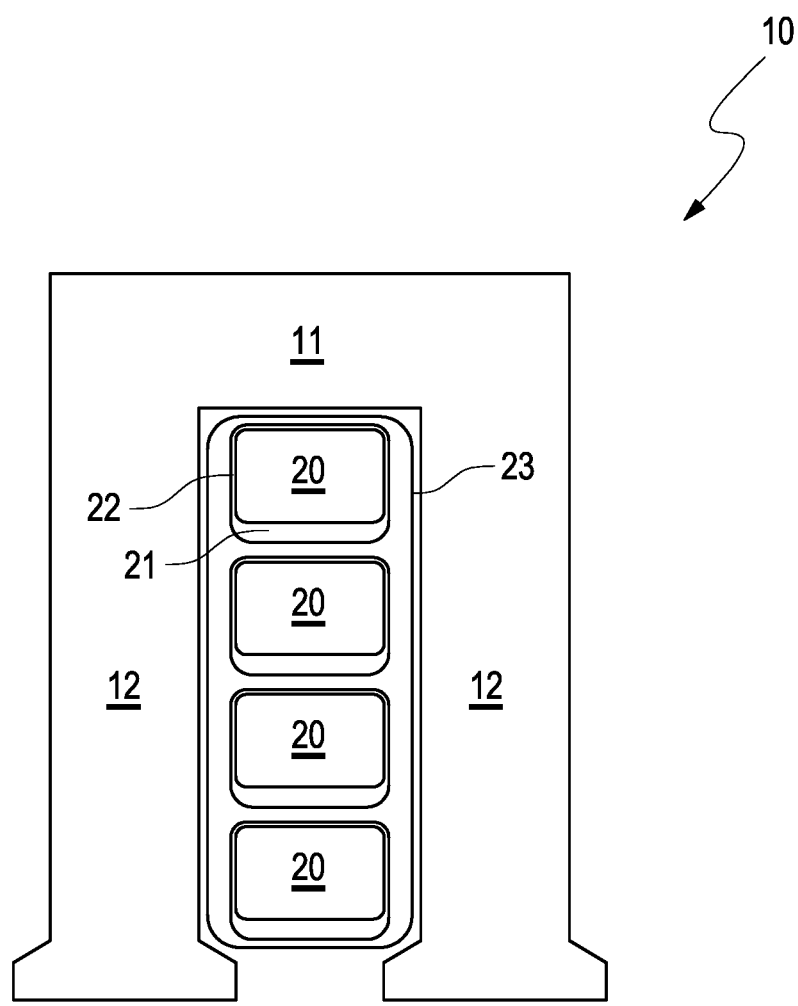

FUNCTIONAL INSULATION OF AN ELECTRICAL MACHINE

BACKGROUND

Technical Field

Embodiments of the invention include an insulation of an electrical machine and a stator equipped with said insulation.

Description of the Related Art

One of the most frequent causes of failure of electrical machines is the occurrence of partial loads, which lead to electrical aging of the insulating system and to destruction of the motor. The highest voltages usually occur between the conductors and the stator and between two phases. To dimension the electrical insulation system, the maximum voltage occurring under defined boundary conditions is calculated on the basis of a standard and the insulating layer thicknesses are designed accordingly. Without further knowledge of the voltage distribution in the electric machine, this leads to the insulating layer being applied uniformly to the copper conductor. The insulation leads to a reduction of the copper content in the conductor and thus to a reduced copper fill factor in the entire groove. This causes the ohmic resistance to increase, which results in an increase in current heat losses and energy consumption in the drive cycle.

A continuously transposed conductor emerges from WO 2012/113 853 A1, consisting of a plurality of individual, electrically insulated single conductors, wherein two or more individual conductors arranged next to each other are respectively combined to form a single conductor group and twisted together. The edges of each individual conductor are rounded in design, wherein the rounding of at least one edge of an individual conductor of an individual conductor group, which delimits a contact surface between two individual conductors lying next to one another, is executed with a smaller radius than the radii of the roundings of the outer edges of the individual conductor group. The thickness of the insulation layer of the single conductors is 0.03-0.08 mm, such as 0.06 mm.

US 2015/042 198 A1 discloses a high-voltage insulation system consisting of two layers which together define an insulation layer, wherein each of the two layers respectively has an upper region and a lower region, which regions have different physical properties. The upper region of one layer and the lower region of the other layer are both hydrophilic and face each other in the insulating layer, and the lower region of one layer and the upper region of the other layer are hydrophobic and face outward from each other in their respective layers.

WO 2014/109 977 A1 discloses an insulated conductor having a multi-layer insulation system and a method of making the same. The multi-layer insulation system has a first insulating layer comprising an aromatic thermoplastic synthetic material overlying the conductor and a second insulating layer comprising a perfluoropolymer adjacent to the first insulating layer. The first and second insulating layers are each applied in a thickness such that the multi-layer insulation system has a scratch abrasion resistance that is significantly greater than the sum of the scratch abrasion resistance of the first and second insulating layers individually at said thickness.

BRIEF SUMMARY

Some embodiments include a copper conductor for the functional insulation of an electrical machine. Some embodiments include a stator equipped with said copper conductor.

Some embodiments provide a copper conductor for the functional insulation of an electrical machine as well as a stator for an electrical machine which exhibit lower current heat losses and reduced energy consumption in the drive cycle.

Some embodiments include a copper conductor with a rectangular cross-section and rounded hairpin edges, which is surrounded by an insulating layer, the thickness of which layer is greater on one side of the rectangular cross-section than on the other three sides. In one embodiment, the insulating layers consist of a uniformly applied insulating varnish (polyamide imide—PAI) and a thereupon layered thermoplastic synthetic material (polyether ether ketone—PEEK), which is applied to the varnish-insulated conductor by extrusion, wherein the layer thickness of the PEEK insulation can be configured variably. In one embodiment, the layer thickness of the insulating layer on one side of the rectangular cross-section adjacent to the next conductor of another phase is between 30% and 100% greater than on the other three sides, by way of example between 35% and 50% greater. In one embodiment, the insulating layer thickness is between 140 µm and 160 µm, by way of example 150 µm, on one side of the rectangular cross-section and between 80 µm and 120 µm, by way of example 110 µm, on the other three sides.

Some embodiments provide a stator of an electrical machine which has a plurality of stator teeth, between which teeth a plurality of copper conductors, for example 4 to 8, are arranged one above the other, in such a way that the side of the cross-section on which the insulating layer is thicker than on the other sides, faces away from the central axis of the stator, which is to say points outwards in the radial direction.

In the stator, a greater insulating layer thickness is provided at the points where the maximum voltage occurs (between the rectangular conductors) than at the sides where no critical voltage is expected. Each conductor has a greater insulating layer thickness (for example, 0.15 mm) on the side closest to the conductor in the radial direction. All other conductor sides have a lesser insulating layer thickness (for example, 0.11 mm or less), since no critical voltage is expected on the sides of the conductor package.

In one embodiment, the entirety of the copper conductors arranged in a stator groove (the conductor package comprising the entirety of the copper conductors arranged between the stator teeth delimiting the groove) is wrapped by a groove insulation paper.

Among the advantages of the solution described herein is that the copper fill factor of the stator can be increased, which leads to an increase in efficiency. In addition, the direct material costs (DMC) for the insulating material can be reduced. Further advantages and embodiments will be apparent from the description and the accompanying drawing.

It is understood that the above-mentioned features and those to be explained below can be used not only in the combination respectively indicated, but also in other combinations or on their own.

BRIEF DESCRIPTION OF THE SEVERAL VIEWS OF THE DRAWINGS

Embodiments are shown in the drawing and are further described with reference to the drawing.

FIG. 1 shows a schematic representation of an embodiment of the stator.

DETAILED DESCRIPTION

FIG. 1 schematically shows a section of an embodiment of the stator 10. One single groove of the stator 10 with stator yoke 11 and two stator teeth 12 is shown. Copper conductors 20 with a rectangular cross-section and rounded hairpin edges are arranged in the groove. In one embodiment, the height of the copper conductor 20 is between 1.4 mm and 2 mm and the width is between 3 mm and 5 mm. Each copper conductor 20 is surrounded by an insulating layer 21, 22, wherein the insulating layer 21 on the side facing away from the stator yoke 11 is thicker than the insulating layer 22 on the other three sides of the copper conductor 20. In the illustrated embodiment, the thickness of the insulating layer 21 is 150 μm, whereas the thickness of the insulating layer 22 is 110 μm or less. A groove insulation paper 23 surrounds the package of copper conductors 20.

German patent application no. 10 2022 102967.0, filed Feb. 9, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
 a plurality of insulated copper conductors arranged in a stack in a stack direction, each of the insulated copper conductors including:
  a copper conductor having a rectangular cross-section with rounded hairpin edges; and
  an insulating layer surrounding the copper conductor, a thickness of the insulating layer on a first side of the rectangular cross-section being greater than a thickness of the insulating layer on the other three sides of the rectangular cross-section, and wherein the plurality of insulated copper conductors are arranged in the stack with the first side of the rectangular cross-section facing in the stacking direction.

2. The system according to claim 1, wherein the thickness of the insulating layer on the first side of the rectangular cross-section is 30% to 100% greater than the thickness of the insulating layer on the other three sides of the rectangular cross-section.

3. The system according to claim 1, wherein the thickness of the insulating layer on the first side of the rectangular cross section is between 140 μm and 160 μm, and the thickness of the insulating layer on the other three sides of the rectangular cross section is between 80 μm and 120 μm.

4. The system according to claim 3, wherein the thickness of the insulating layer on the first side of the rectangular cross section is 150 μm, and the thickness of the insulating layer on the other three sides of the rectangular cross section is 110 μm.

5. The system according to claim 1, wherein the insulating layer consists of a layer of insulating varnish of uniform thickness and a layer of thermoplastic synthetic material applied to the insulating varnish on the first side.

6. The system according to claim 5, wherein the layer of thermoplastic synthetic material is applied by extrusion from the layer of insulating varnish.

7. The system according to claim 5, wherein the thermoplastic synthetic material is a polyether ether ketone.

8. A stator of an electric machine comprising a plurality of the systems according to claim 1 and a plurality of stator teeth between which teeth a respective one of the systems is arranged, in such a way that the first side of the cross-section on which the thickness of the insulating layer is greater than the thickness of the insulating layer on the other sides of the cross-section faces toward an opening between adjacent stator teeth.

9. The stator according to claim 8, wherein each conductor package that is formed by the plurality of copper conductors of the respective system arranged between two adjacent stator teeth is wrapped by a respective groove insulation paper.

* * * * *